(12) United States Patent
Lambdin et al.

(10) Patent No.: US 9,620,107 B2
(45) Date of Patent: Apr. 11, 2017

(54) VOICE INSPECTION GUIDANCE

(71) Applicant: General Electric Company, Schenectady, NY (US)

(72) Inventors: Thomas Eldred Lambdin, Auburn, NY (US); Michael Christopher Domke, Skaneateles, NY (US)

(73) Assignee: General Electric Company, Schenectady, NY (US)

(*) Notice: Subject to any disclaimer, the term of this patent is extended or adjusted under 35 U.S.C. 154(b) by 335 days.

(21) Appl. No.: 13/732,303

(22) Filed: Dec. 31, 2012

(65) Prior Publication Data

US 2014/0188473 A1   Jul. 3, 2014

(51) Int. Cl.

| | | |
|---|---|---|
| *G10L 17/00* | (2013.01) | |
| *G10L 15/08* | (2006.01) | |
| *G10L 15/26* | (2006.01) | |
| *G06Q 10/08* | (2012.01) | |
| *G10L 21/00* | (2013.01) | |
| *G10L 15/00* | (2013.01) | |
| *G10L 19/00* | (2013.01) | |
| *G10L 13/00* | (2006.01) | |
| *G06F 15/16* | (2006.01) | |
| *G06F 3/048* | (2013.01) | |
| *G06F 7/00* | (2006.01) | |
| *G09B 19/00* | (2006.01) | |

(Continued)

(52) U.S. Cl.
CPC .............. *G10L 15/08* (2013.01); *G06Q 10/08* (2013.01); *G10L 15/26* (2013.01)

(58) Field of Classification Search
USPC ....... 704/9, 257, 235, 246, 251, 209, 260, 3, 704/201, 243, 275; 701/29.1; 715/782, 715/780; 340/692; 455/550.1; 713/185; 345/473; 376/249; 600/437; 73/622; 434/236; 709/203
See application file for complete search history.

(56) References Cited

U.S. PATENT DOCUMENTS 4,627,001 A * 12/1986 Stapleford .............. G10L 19/00
369/83
5,845,240 A * 12/1998 Fielder ............ G11B 20/10527
360/48

(Continued)

OTHER PUBLICATIONS

International Search Report and Written Opinion issued in connection with corresponding PCT Application No. PCT/US2013/072734 dated Jun. 25, 2014.

(Continued)

*Primary Examiner* — Pierre-Louis Desir
*Assistant Examiner* — Neeraj Sharma
(74) *Attorney, Agent, or Firm* — Fletcher Yoder, P.C.

(57) ABSTRACT

A system is provided that includes an inspection instrument. The inspection instrument includes communications circuitry, configured to communicatively couple the inspection instrument with information services; an audio input device, configured to receive inspection audio; and a processor, configured to query the information services via sending a request to the information services based upon an analysis of keywords, phrases, or both interpreted from the inspection audio. A voice recognition system configured to analyze the inspection audio for the keywords, phrases, or both is also provided.

18 Claims, 9 Drawing Sheets

(51) Int. Cl.
  *G08B 25/08* (2006.01)
  *G01N 9/24* (2006.01)
  *A61B 8/00* (2006.01)

(56) References Cited

U.S. PATENT DOCUMENTS

| | | | |
|---|---|---|---|
| 6,317,039 B1 | 11/2001 | Thomason | |
| 6,470,306 B1* | 10/2002 | Pringle | G06F 17/241 704/3 |
| 6,536,283 B1* | 3/2003 | Hatley | G21C 17/017 376/249 |
| 6,830,545 B2 | 12/2004 | Bendall | |
| 7,729,904 B2* | 6/2010 | Bennett | G06F 17/27 704/215 |
| 8,059,882 B2 | 11/2011 | Amidi | |
| 8,108,168 B2 | 1/2012 | Sharp et al. | |
| 8,255,170 B2 | 8/2012 | Kollgaard et al. | |
| 8,521,766 B1* | 8/2013 | Hoarty | G06F 17/30023 704/251 |
| 8,543,401 B2* | 9/2013 | Suendermann | G10L 15/063 382/224 |
| 2002/0138269 A1* | 9/2002 | Philley | 704/260 |
| 2002/0198997 A1 | 12/2002 | Linthicum et al. | |
| 2003/0171926 A1* | 9/2003 | Suresh | G10L 15/26 704/270.1 |
| 2004/0193420 A1* | 9/2004 | Kennewick | G06F 17/30654 704/257 |
| 2004/0243403 A1* | 12/2004 | Matsunaga et al. | 704/209 |
| 2005/0054920 A1 | 3/2005 | Washburn et al. | |
| 2005/0275558 A1* | 12/2005 | Papadimitriou et al. | 340/692 |
| 2007/0050191 A1* | 3/2007 | Weider | G06F 17/30864 704/275 |
| 2007/0142078 A1* | 6/2007 | Chen | H04M 1/575 455/550.1 |
| 2009/0244071 A1* | 10/2009 | Kuo | G06F 17/2872 345/473 |
| 2009/0307628 A1 | 12/2009 | Metala et al. | |
| 2010/0205450 A1* | 8/2010 | Sarnacke | G07C 5/0808 713/185 |
| 2011/0136085 A1* | 6/2011 | Leroy | G06Q 10/10 434/236 |
| 2011/0270609 A1* | 11/2011 | Jones | 704/235 |
| 2012/0023435 A1* | 1/2012 | Kneppers | G06Q 50/16 715/780 |
| 2012/0072217 A1* | 3/2012 | Bangalore | G10L 15/1807 704/243 |
| 2014/0095173 A1* | 4/2014 | Lynch | G10L 15/22 704/275 |
| 2014/0172419 A1* | 6/2014 | John | G06F 17/30746 704/201 |
| 2014/0289323 A1* | 9/2014 | Kutaragi | G06Q 50/01 709/203 |

OTHER PUBLICATIONS

Smith, "A Recording and Presentation System for Manual Ultrasonic Inspections Using a Speech Recognition Interface", Thesis Submitted to the University of Paisley for the Degree of Doctor of Philosophy, pp. 210, Apr. 1, 1998 XP009176757.
U.S. Appl. No. 13/732,238, filed Dec. 31, 2012, Michael Christopher Domke.
U.S. Appl. No. 13/732,252, filed Dec. 31, 2012, Kevin Andrew Coombs.
U.S. Appl. No. 13/732,261, filed Dec. 31, 2012, Eugene Schiefer.
U.S. Appl. No. 13/732,281, filed Dec. 31, 2012, Jason Howard Messinger.
U.S. Appl. No. 13/732,293, filed Dec. 31, 2012, Jason Howard Messinger.
U.S. Appl. No. 13/732,303, filed Dec. 31, 2012, Thomas Eldred Lambdin.
U.S. Appl. No. 13/732,309, filed Dec. 31, 2012, Jason Howard Messinger.
U.S. Appl. No. 13/732,272, filed Dec. 31, 2012, Jason Howard Messinger.
U.S. Appl. No. 13/732,319, filed Dec. 31, 2012, Michael Christopher Domke.
U.S. Appl. No. 13/732,327, filed Dec. 31, 2012, Michael Christopher Domke.
U.S. Appl. No. 13/747,408, filed Jan. 22, 2013, Michael Christopher Domke.
U.S. Appl. No. 13/747,435, filed Jan. 22, 2013, Jason Howard Messinger.
U.S. Appl. No. 13/747,438, filed Jan. 22, 2013, Jason Howard Messinger.
U.S. Appl. No. 13/747,457, filed Jan. 22, 2013, Jason Howard Messinger.
U.S. Appl. No. 13/747,453, filed Jan. 22, 2013, Sekhar Soorianarayanan.
U.S. Appl. No. 13/747,429, filed Jan. 22, 2013, Sekhar Soorianarayanan.
U.S. Appl. No. 13/747,464, filed Jan. 22, 2013, Sekhar Soorianarayanan.
U.S. Appl. No. 13/747,443, filed Jan. 22, 2013, Jason Howard Messinger.
U.S. Appl. No. 13/747,449, filed Jan. 22, 2013, Michael Christopher Domke.
U.S. Appl. No. 13/747,456, filed Jan. 22, 2013, Michael Christopher Domke.
U.S. Appl. No. 13/747,416, filed Jan. 22, 2013, Michael Christopher Domke.
U.S. Appl. No. 13/800,015, filed Mar. 13, 2013, Kevin Andrew Coombs.
Sorrel, Charlie. iControlPad Ships at Last [online], [retrieved on Mar. 21, 2013]. Retrieved from the Internet <URL: http://www.wired.com/gadgetlab/2011/11/icontrolpad-ships-at-last/>.
OmniScan MX [online]. p. 5. Olympus, 2010 [retrieved on Mar. 28, 2013]. Retrieved from the Internet: <URL: www.olympus-ims.com/en/omniscan-mx/>.
Georgeson, Gary. [online], [retrieved on Mar. 28, 2013]. http://www.meetingdata.utcdayton.com/agenda/airworthiness/2012/proceedings/presentations/P5526.pdf.
Phasor XS User's Manual [online]. General Electric: Measurement & Control Solutions. [retrieved on Mar. 28, 2013]. Retrieved from the Internet: <URL: www.ge-mcs.com/download/ultrasound/portable-flaw-detectors/Phasor%20Series/om-phasor-en_rev10.pdf>.
USM Vision 1.2—A Total Weld Inspection Solution to Increase Productivity in New Process Pipework Fabrication [online]. General Electric: Measurement & Control. [retrieved on Mar. 28, 2013]. Retrieved from the Internet: <URL: www.ge-mcs.com/download/ultrasound/portable-flaw-detectors/usm-vision/GEIT-USMVision-20058EN_LR.pdf>.
PCT Invitation to Pay Additional Fees and Search Report dated Mar. 4, 2014 issued in connection with corresponding PCT Application No. PCT/US2013/072734.

* cited by examiner

VOICE INSPECTION GUIDANCE

BACKGROUND

The subject matter disclosed herein relates to inspection planning, execution, and reporting. More specifically, the subject matter disclosed herein relates to utilizing voice recognition in inspection voice recordings to facilitate information gathering during the inspection process.

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support. During equipment operations, the equipment may degrade, encounter undesired conditions such as corrosion, wear and tear, and so on, potentially affecting overall equipment effectiveness. Certain inspection techniques, such as non-destructive inspection techniques or non-destructive testing (NDT) techniques, may be used to detect undesired equipment conditions.

In a conventional NDT system, data may be shared with other NDT operators or personnel using portable memory devices, paper, of through the telephone. As such, the amount of time to share data between NDT personnel may depend largely on the speed at which the physical portable memory device is physically dispatched to its target. Accordingly, it would be beneficial to improve the data sharing capabilities of the NDT system, for example, to more efficiently test and inspect a variety of systems and equipment. NDT relates to the examination of an object, material, or system without reducing future usefulness. In particular NDT inspections may be used to determine the integrity of a product using time-sensitive inspection data relating to a particular product. For example, NDT inspections may observe the "wear and tear" of a product over a particular time-period.

Many forms of NDT are currently known. For example, perhaps the most common NDT method is visual examination. During a visual examination, an inspector may, for example, simply visually inspect an object for visible imperfections. Alternatively, visual inspections may be conducted using optical technologies such as a computer-guided camera, a borescope, etc. Radiography is another form of NDT. Radiography relates to using radiation (e.g., x-rays and/or gamma rays) to detect thickness and/or density changes to a product, which may denote a defect in the product. Further, ultrasonic testing relates to transmitting high-frequency sound waves into a product to detect changes and/or imperfections to the product. Using a pulse-echo technique, sound it introduced into the product and echoes from the imperfections are returned to a receiver, signaling that the imperfection exists. Many other forms of NDT exist. For example, magnetic particle testing, penetrant testing, electromagnetic testing, leak testing, and acoustic emission testing, to name a few.

Oftentimes, product inspections may be quite complex due to the complex nature of the product being tested. For example, airplanes are very complex machines where safety and inspection standards are of the utmost importance. The Boeing 777 aircraft may have as many 3 million parts. Accordingly, a tremendous amount of time and effort is used to inspect these aircraft on a periodic basis. Further, historical data relating to previous inspections may be used to compare and contrast inspection results to understand trending data. Further, inspection data for an entire fleet of products (e.g., a fleet of Boeing 777's) may be useful for inspection purposes. As may be appreciated, massive amounts of data may be gathered and used in the inspection process. This data may be pulled from many sources and may be crucial for accurate inspection.

Unfortunately, in conventional inspection systems, accessing this data is predominantly a manual process. This manual process may lead to inefficient use of inspection personnel and equipment. Accordingly, improved systems and methods for filtering and/or accessing inspection data are desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system is provided that includes an inspection instrument. The inspection instrument includes communications circuitry, configured to communicatively couple the inspection instrument with information services; an audio input device, configured to receive inspection audio; and a processor, configured to query the information services via sending a request to the information services based upon an analysis of keywords, phrases, or both interpreted from the inspection audio. A voice recognition system configured to analyze the inspection audio for the keywords, phrases, or both is also provided.

In a second embodiment, a method is provided. The method includes analyzing, via a computer processor, an inspection audio recording for keywords, phrases, or both associated with an inspection; associating the keywords, phrases, or both as metadata for inspection data acquired in time proximity to the audio recording; and storing the inspection data with the associated keywords, phrases, or both such that subsequent queries on the keywords, phrases, or both will retrieve the inspection data.

In a third embodiment, a system is provided that includes an inspection instrument. The inspection instrument includes communications circuitry that communicatively couples the inspection instrument with information services; an audio input device that receives inspection audio; a processor that queries the information services via sending a request to the information services based upon an analysis of keywords, phrases, or both interpreted from the inspection audio; and a voice recognition system that analyzes the inspection audio for the keywords, phrases, or both.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
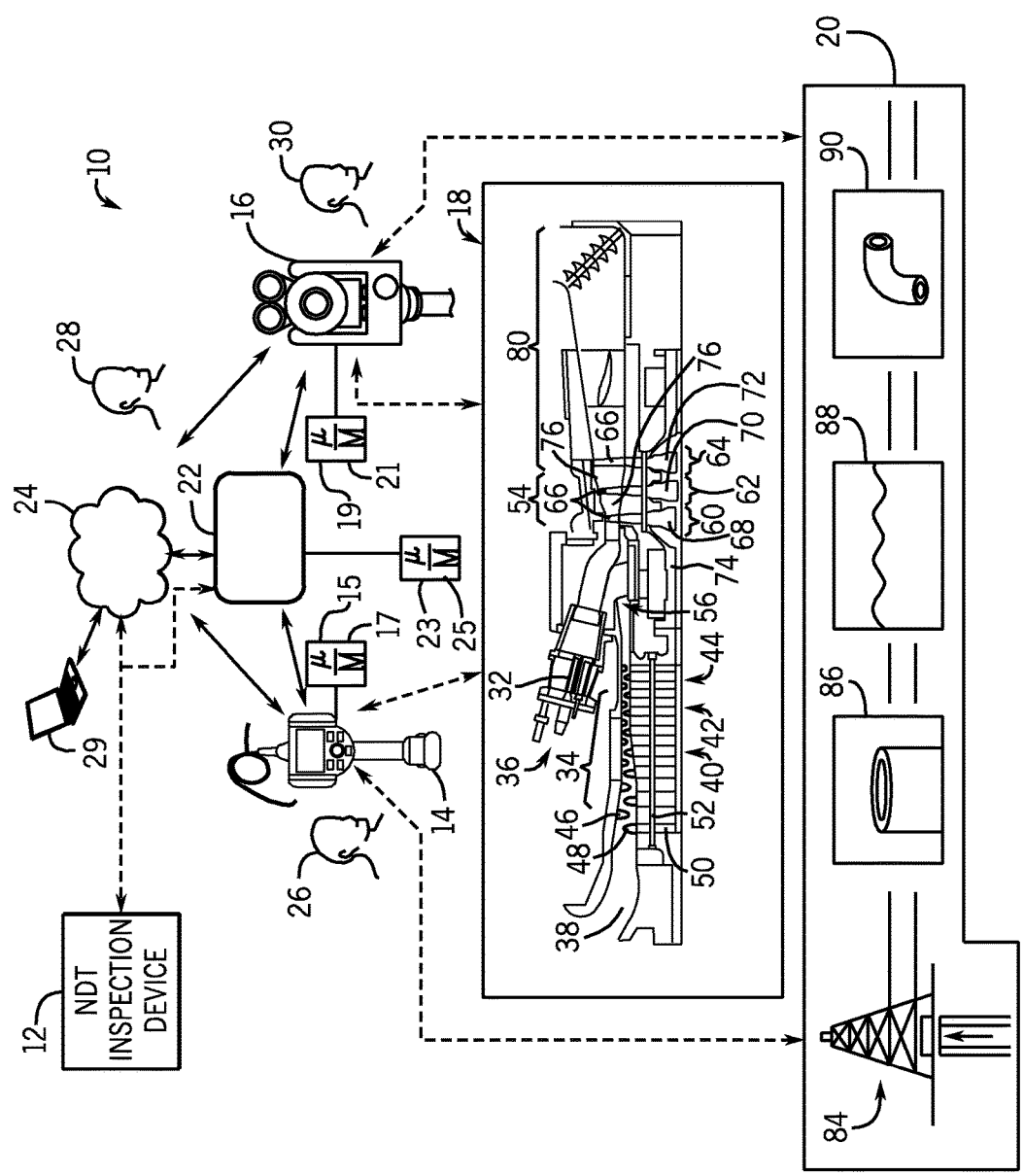
FIG. 1 is a block diagram illustrating an embodiment of a distributed non-destructive testing (NDT) system, including a mobile device.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection and testing techniques, including non-destructive testing (NDT) or inspection systems. In the NDT system, certain techniques such as borescopic inspection, weld inspection, remote visual inspections, x-ray inspection, ultrasonic inspection, eddy current inspection, and the like, may be used to analyze and detect a variety of conditions, including but not limited to corrosion, equipment wear and tear, cracking, leaks, and so on. The techniques described herein provide for improved NDT systems suitable for borescopic inspection, remote visual inspections, x-ray inspection, ultrasonic inspection, and/or eddy current inspection, enabling enhanced data gathering, data analysis, inspection/testing processes, and NDT collaboration techniques.

The improved NDT systems described herein may include inspection equipment using wireless conduits suitable for communicatively coupling the inspection equipment to mobile devices, such as tablets, smart phones, and augmented reality eyeglasses; to computing devices, such as notebooks, laptops, workstations, personal computers; and to "cloud" computing systems, such as cloud-based NDT ecosystems, cloud analytics, cloud-based collaboration and workflow systems, distributed computing systems, expert systems and/or knowledge-based systems. Indeed, the techniques described herein may provide for enhanced NDT data gathering, analysis, and data distribution, thus improving the detection of undesired conditions, enhancing maintenance activities, and increasing returns on investment (ROI) of facilities and equipment.

In one embodiment, a tablet may be communicatively coupled to the NDT inspection device (e.g., borescope, transportable pan-tilt-zoom camera, eddy current device, x-ray inspection device, ultrasonic inspection device), such as a MENTOR™ NDT inspection device, available from General Electric, Co., of Schenectady, N.Y., and used to provide, for example, enhanced wireless display capabilities, remote control, data analytics and/or data communications to the NDT inspection device. While other mobile devices may be used, the use of the tablet is apt, however, insofar as the tablet may provide for a larger, higher resolution display, more powerful processing cores, an increased memory, and improved battery life. Accordingly, the tablet may address certain issues, such as providing for improved visualization of data, improving the manipulatory control of the inspection device, and extending collaborative sharing to a plurality of external systems and entities.

Keeping the foregoing in mind, the present disclosure is directed towards sharing data acquired from the NDT system and/or control of applications and/or devices in the NDT system. Generally, data generated from the NDT system may be automatically distributed to various people or groups of people using techniques disclosed herein. Moreover, content displayed by an application used to monitor and/or control devices in the NDT system may be shared between individuals to create a virtual collaborative environment for monitoring and controlling the devices in the NDT system.

By way of introduction, and turning now to FIG. 1, the figure is a block diagram of an embodiment of distributed NDT system 10. In the depicted embodiment, the distributed NDT system 10 may include one or more NDT inspection devices 12. The NDT inspection devices 12 may be divided into at least two categories. In one category, depicted in FIG. 1, the NDT inspection devices 12 may include devices suitable for visually inspecting a variety of equipment and environments. In another category, described in more detail with respect to FIG. 2 below, the NDT devices 12 may include devices providing for alternatives to visual inspection modalities, such as x-ray inspection modalities, eddy current inspection modalities, and/or ultrasonic inspection modalities.

In the depicted first example category of FIG. 1, the NDT inspection devices 12 may include a borescope 14 having one or more processors 15 and a memory 17, and a transportable pan-tilt-zoom (PTZ) camera 16 having one or more processors 19 and a memory 21. In this first category of visual inspection devices, the bore scope 14 and PTZ camera 16 may be used to inspect, for example, a turbo machinery 18, and a facility or site 20. As illustrated, the bore scope 14 and the PTZ camera 16 may be communicatively coupled to a mobile device 22 also having one or more processors 23 and a memory 25. The mobile device 22 may include, for example, a tablet, a cell phone (e.g., smart phone), a notebook, a laptop, or any other mobile computing device. The use of a tablet, however, is apt insofar as the tablet provides for a good balance between screen size, weight, computing power, and battery life. Accordingly, in one embodiment, the mobile device 22 may be the tablet mentioned above, that provides for touchscreen input. The mobile device 22 may be communicatively coupled to the NDT inspection devices 12, such as the bore scope 14 and/or the PTZ camera 16, through a variety of wireless or wired conduits. For example, the wireless conduits may include WiFi (e.g., Institute of Electrical and Electronics Engineers [IEEE] 802.11X), cellular conduits (e.g., high speed packet access [HSPA], HSPA+, long term evolution [LTE], WiMax), near field communications (NFC), Bluetooth, personal area networks (PANs), and the like. The wireless conduits may use a variety of communication protocols, such as TCP/IP, UDP, SCTP, socket layers, and so on. In certain embodiments, the wireless or wired conduits may include secure layers, such as secure socket layers (SSL), virtual private network (VPN) layers, encrypted layers, challenge key authentication layers, token authentication layers, and so on. Wired conduits may include proprietary cabling, RJ45 cabling, co-axial cables, fiber optic cables, and so on.

Additionally or alternatively, the mobile device 22 may be communicatively coupled to the NDT inspection devices 12, such as the borescope 14 and/or the PTZ camera 16, through the "cloud" 24. Indeed, the mobile device 22 may use the cloud 24 computing and communications techniques (e.g., cloud-computing network), including but not limited to HTTP, HTTPS, TCP/IP, service oriented architecture (SOA) protocols (e.g., simple object access protocol [SOAP], web services description languages (WSDLs)) to interface with the NDT inspection devices 12 from any geographic location, including geographic locations remote from the physical location about to undergo inspection. Further, in one embodiment, the mobile device 22 may provide "hot spot" functionality in which mobile device 22 may provide wireless access point (WAP) functionality suitable for connecting the NDT inspection devices 12 to other systems in the cloud 24, or connected to the cloud 24, such as a computing system 29 (e.g., computer, laptop, virtual machine(s) [VM], desktop, workstation). Accordingly, collaboration may be enhanced by providing for multi-party workflows, data gathering, and data analysis.

For example, a borescope operator 26 may physically manipulate the borescope 14 at one location, while a mobile device operator 28 may use the mobile device 22 to interface with and physically manipulate the bore scope 14 at a second location through remote control techniques. The second location may be proximate to the first location, or geographically distant from the first location. Likewise, a camera operator 30 may physically operate the PTZ camera 16 at a third location, and the mobile device operator 28 may remote control PTZ camera 16 at a fourth location by using the mobile device 22. The fourth location may be proximate to the third location, or geographically distant from the third location. Any and all control actions performed by the operators 26 and 30 may be additionally performed by the operator 28 through the mobile device 22. Additionally, the operator 28 may communicate with the operators 26 and/or 30 by using the devices 14, 16, and 22 through techniques such as voice over IP (VOIP), virtual whiteboarding, text messages, and the like. By providing for remote collaboration techniques between the operator 28 operator 26, and operator 30, the techniques described herein may provide for enhanced workflows and increase resource efficiencies. Indeed, nondestructive testing processes may leverage the communicative coupling of the cloud 24 with the mobile device 22, the NDT inspection devices 12, and external systems coupled to the cloud 24.

In one mode of operation, the mobile device 22 may be operated by the bore scope operator 26 and/or the camera operator 30 to leverage, for example, a larger screen display, more powerful data processing, as well as a variety of interface techniques provided by the mobile device 22, as described in more detail below. Indeed, the mobile device 22 may be operated alongside or in tandem with the devices 14 and 16 by the respective operators 26 and 30. This enhanced flexibility provides for better utilization of resources, including human resources, and improved inspection results.

Whether controlled by the operator 28, 26, and/or 30, the borescope 14 and/or PTZ camera 16 may be used to visually inspect a wide variety of equipment and facilities. For example, the bore scope 14 may be inserted into a plurality of borescope ports and other locations of the turbomachinery 18, to provide for illumination and visual observations of a number of components of the turbomachinery 18. In the depicted embodiment, the turbo machinery 18 is illustrated as a gas turbine suitable for converting carbonaceous fuel into mechanical power. However, other equipment types may be inspected, including compressors, pumps, turbo expanders, wind turbines, hydroturbines, industrial equipment, and/or residential equipment. The turbomachinery 18 (e.g., gas turbine) may include a variety of components that may be inspected by the NDT inspection devices 12 described herein.

With the foregoing in mind, it may be beneficial to discuss certain turbomachinery 18 components that may be inspected by using the embodiments disclosed herein. For example, certain components of the turbomachinery 18 depicted in FIG. 1, may be inspected for corrosion, erosion, cracking, leaks, weld inspection, and so on. Mechanical systems, such as the turbomachinery 18, experience mechanical and thermal stresses during operating conditions, which may require periodic inspection of certain components. During operations of the turbomachinery 18, a fuel such as natural gas or syngas, may be routed to the turbomachinery 18 through one or more fuel nozzles 32 into a combustor 36. Air may enter the turbomachinery 18 through an air intake section 38 and may be compressed by a compressor 34. The compressor 34 may include a series of stages 40, 42, and 44 that compress the air. Each stage may include one or more sets of stationary vanes 46 and blades 48 that rotate to progressively increase the pressure to provide compressed air. The blades 48 may be attached to rotating wheels 50 connected to a shaft 52. The compressed discharge air from the compressor 34 may exit the compressor 34 through a diffuser section 56 and may be directed into the combustor 36 to mix with the fuel. For example, the fuel nozzles 32 may inject a fuel-air mixture into the combustor 36 in a suitable ratio for optimal combustion, emissions, fuel consumption, and power output. In certain embodiments, the turbomachinery 18 may include multiple combustors 36 disposed in an annular arrangement. Each combustor 36 may direct hot combustion gases into a turbine 54.

As depicted, the turbine 54 includes three separate stages 60, 62, and 64 surrounded by a casing 76. Each stage 60, 62, and 64 includes a set of blades or buckets 66 coupled to a respective rotor wheel 68, 70, and 72, which are attached to a shaft 74. As the hot combustion gases cause rotation of turbine blades 66, the shaft 74 rotates to drive the compressor 34 and any other suitable load, such as an electrical generator. Eventually, the turbomachinery 18 diffuses and exhausts the combustion gases through an exhaust section 80. Turbine components, such as the nozzles 32, intake 38, compressor 34, vanes 46, blades 48, wheels 50, shaft 52, diffuser 56, stages 60, 62, and 64, blades 66, shaft 74, casing 76, and exhaust 80, may use the disclosed embodiments, such as the NDT inspection devices 12, to inspect and maintain said components.

Additionally, or alternatively, the PTZ camera 16 may be disposed at various locations around or inside of the turbo machinery 18, and used to procure visual observations of these locations. The PTZ camera 16 may additionally include one or more lights suitable for illuminating desired locations, and may further include zoom, pan and tilt techniques described in more detail below with respect to FIG. 4, useful for deriving observations around in a variety of difficult to reach areas. The borescope 14 and/or the camera 16 may be additionally used to inspect the facilities 20, such as an oil and gas facility 20. Various equipment such as oil and gas equipment 84, may be inspected visually by using the borescope 14 and/or the PTZ camera 16. Advantageously, locations such as the interior of pipes or conduits 86, underwater (or underfluid) locations 88, and difficult to observe locations such as locations having curves or bends 90, may be visually inspected by using the mobile device 22 through the borescope 14 and/or PTZ camera 16. Accordingly, the mobile device operator 28 may more safely and efficiently inspect the equipment 18, 84 and locations 86, 88, and 90, and share observations in real-time or near real-time with location geographically distant from the inspection areas. It is to be understood that other NDT inspection devices 12 may be use the embodiments described herein, such as fiberscopes (e.g., articulating fiberscope, non-articulating fiberscope), and remotely operated vehicles (ROVs), including robotic pipe inspectors and robotic crawlers.

Figure 2:
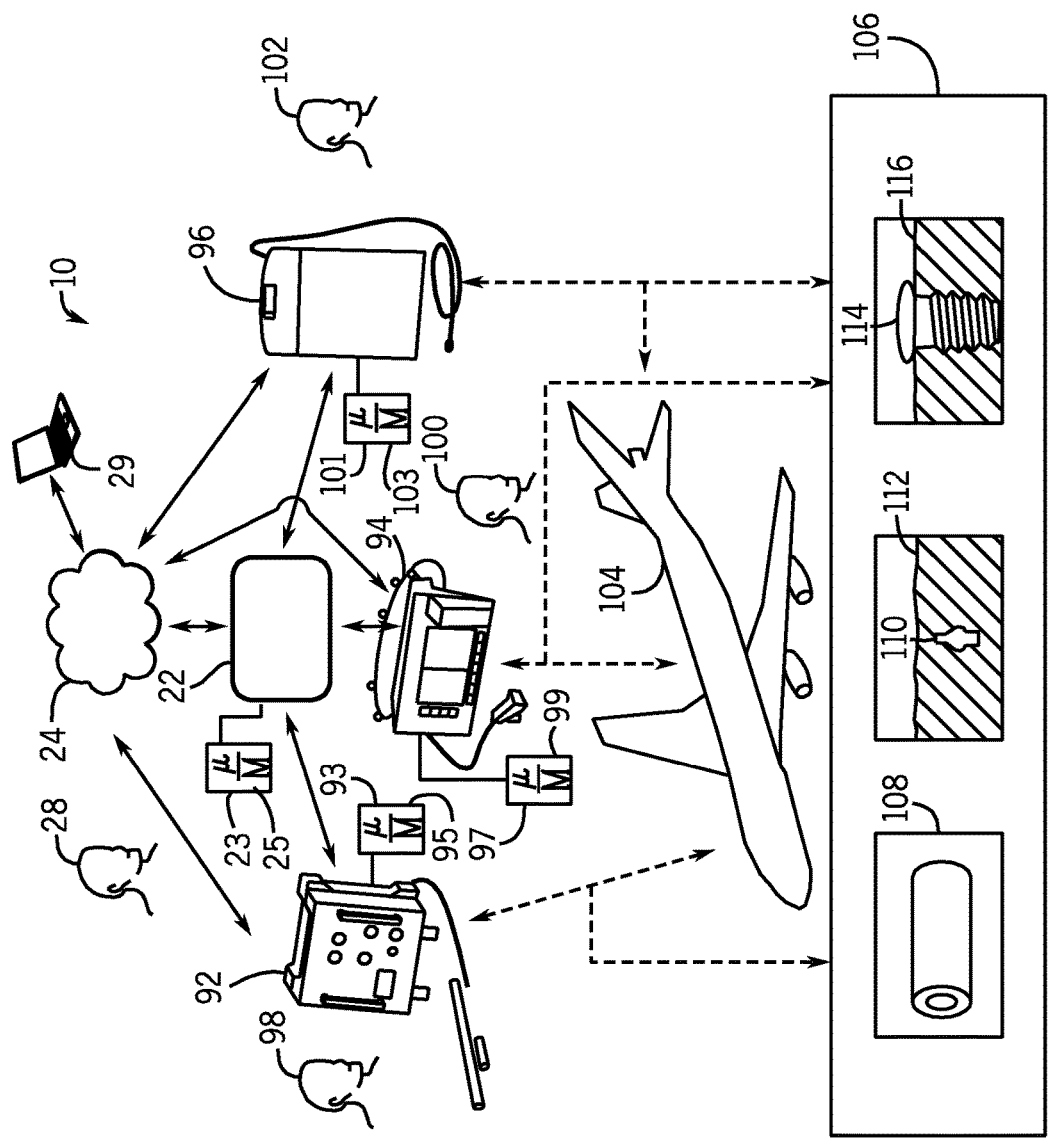
FIG. 2 is a block diagram illustrating further details of an embodiment of the distributed NDT system of FIG. 1.

Turning now to FIG. 2, the figure is a block diagram of an embodiment of the distributed NDT system 10 depicting the second category of NDT inspection devices 12 that may be able to provide for alternative inspection data to visual inspection data. For example, the second category of NDT inspection devices 12 may include an eddy current inspection device 92, an ultrasonic inspection device, such as an ultrasonic flaw detector 94, and an x-ray inspection device, such a digital radiography device 96. The eddy current inspection device 92 may include one or more processors 93 and a memory 95. Likewise, the ultrasonic flaw detector 94 may include one or more processors 97 and a memory 104. Similarly, the digital radiography device 96 may include one or more processors 101 and a memory 103. In operations, the eddy current inspection device 92 may be operated by an eddy current operator 98, the ultrasonic flaw detector 94 may be operated by an ultrasonic device operator 100, and the digital radiography device 96 may be operated by a radiography operator 102.

As depicted, the eddy current inspection device 92, the ultrasonic flaw detector 94, and the digital radiography inspection device 96, may be communicatively coupled to the mobile device 22 by using wired or wireless conduits, including the conduits mentioned above with respect to FIG. 1. Additionally, or alternatively, the devices 92, 94, and 96 may be coupled to the mobile device 22 by using the cloud 24, for example the borescope 14 may be connected to a cellular "hotspot," and use the hotspot to connect to one or more experts in borescopic inspection and analysis. Accordingly, the mobile device operator 28 may remotely control various aspects of operations of the devices 92, 94, and 96 by using the mobile device 22, and may collaborate with the operators 98, 100, and 102 through voice (e.g., voice over IP [VOIP]), data sharing (e.g., whiteboarding), providing data analytics, expert support and the like, as described in more detail herein.

Accordingly, it may be possible to enhance the visual observation of various equipment, such as an aircraft system 104 and facilities 106, with x-ray observation modalities, ultrasonic observation modalities, and/or eddy current observation modalities. For example, the interior and the walls of pipes 108 may be inspected for corrosion and/or erosion. Likewise, obstructions or undesired growth inside of the pipes 108 may be detected by using the devices 92, 94, and/or 96. Similarly, fissures or cracks 110 disposed inside of certain ferrous or non-ferrous material 112 may be observed. Additionally, the disposition and viability of parts 114 inserted inside of a component 116 may be verified. Indeed, by using the techniques described herein, improved inspection of equipment and components 104, 108, 112 and 116 may be provided. For example, the mobile device 22 may be used to interface with and provide remote control of the devices 14, 16, 92, 94, and 96.

Figure 3:
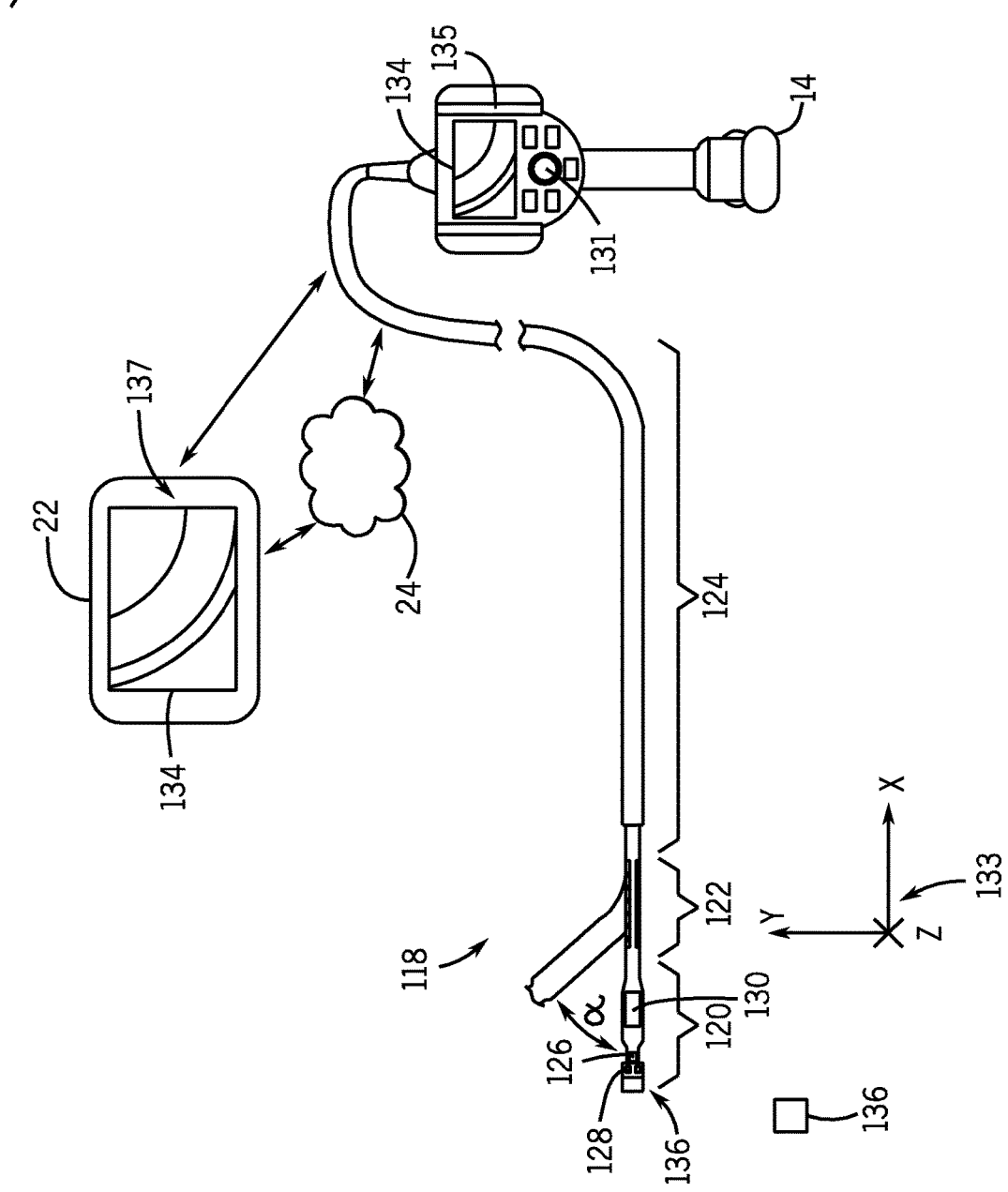
FIG. 3 is a front view illustrating an embodiment of a borescope system 14 communicatively coupled to the mobile device of FIG. 1 and a "cloud;"

FIG. 3 is a front view of the borescope 14 coupled to the mobile device 22 and the cloud 24. Accordingly, the boresecope 14 may provide data to any number of devices connected to the cloud 24 or inside the cloud 24. As mentioned above, the mobile device 22 may be used to receive data from the borescope 14, to remote control the borescope 14, or a combination thereof. Indeed, the techniques described herein enable, for example, the communication of a variety of data from the borescope 14 to the mobile device 22, including but not limited to images, video, and sensor measurements, such as temperature, pressure, flow, clearance (e.g., measurement between a stationary component and a rotary component), and distance measurements. Likewise, the mobile device 22 may communicate control instructions, reprogramming instructions, configuration instructions, and the like, as described in more detail below.

As depicted the borescope 14, includes an insertion tube 118 suitable for insertion into a variety of location, such as inside of the turbomachinery 18, equipment 84, pipes or conduits 86, underwater locations 88, curves or bends 90, varies locations inside or outside of the aircraft system 104, the interior of pipe 108, and so on. The insertion tube 118 may include a head end section 120, an articulating section 122, and a conduit section 124. In the depicted embodiment, the head end section 120 may include a camera 126, one or more lights 128 (e.g., LEDs), and sensors 130. As mentioned above, the borescope's camera 126 may provide images and video suitable for inspection. The lights 128 may be used to provide for illumination when the head end 120 is disposed in locations having low light or no light.

During use, the articulating section 122 may be controlled, for example, by the mobile device 22 and/or a physical joy stick 131 disposed on the borescope 14. The articulating sections 122 may steer or "bend" in various dimensions. For example, the articulation section 122 may enable movement of the head end 120 in an X-Y plane X-Z plane and/or Y-Z plane of the depicted XYZ axes 133. Indeed, the physical joystick 131 and/or the mobile device 22 may both be used alone or in combination, to provide control actions suitable for disposing the head end 120 at a variety of angles, such as the depicted angle α. In this manner, the borescope head end 120 may be positioned to visually inspect desired locations. The camera 126 may then capture, for example, a video 134, which may be displayed in a screen 135 of the borescope 14 and a screen 137 of the mobile device 22, and may be recorded by the borescope 14 and/or the mobile device 22. In one embodiment, the screens 135 and 137 may be multi-touchscreens using capacitance techniques, resistive techniques, infrared grid techniques, and the like, to detect the touch of a stylus and/or one or more human fingers. Additionally or alternatively, images and the video 134 may be transmitted into the cloud 24.

Other data, including but not limited to sensor 130 data, may additionally be communicated and/or recorded by the borescope 14. The sensor 130 data may include temperature data, distance data, clearance data (e.g., distance between a rotating and a stationary component), flow data, and so on. In certain embodiments, the borescope 14 may include a plurality of replacement tips 136. For example, the replacement tips 136 may include retrieval tips such as snares, magnetic tips, gripper tips, and the like. The replacement tips 136 may additionally include cleaning and obstruction removal tools, such as wire brushes, wire cutters, and the like. The tips 136 may additionally include tips having differing optical characteristics, such as focal length, stereoscopic views, 3-dimensional (3D) phase views, shadow views, and so on. Additionally or alternatively, the head end 120 may include a removable and replaceable head end 120. Accordingly, a plurality of head ends 120 may be provided at a variety of diameters, and the insertion tube 118 maybe disposed in a number of locations having openings from approximately one millimeter to ten millimeters or more. Indeed, a wide variety of equipment and facilities may be inspected, and the data may be shared through the mobile device 22 and/or the cloud 24.

Figure 4:
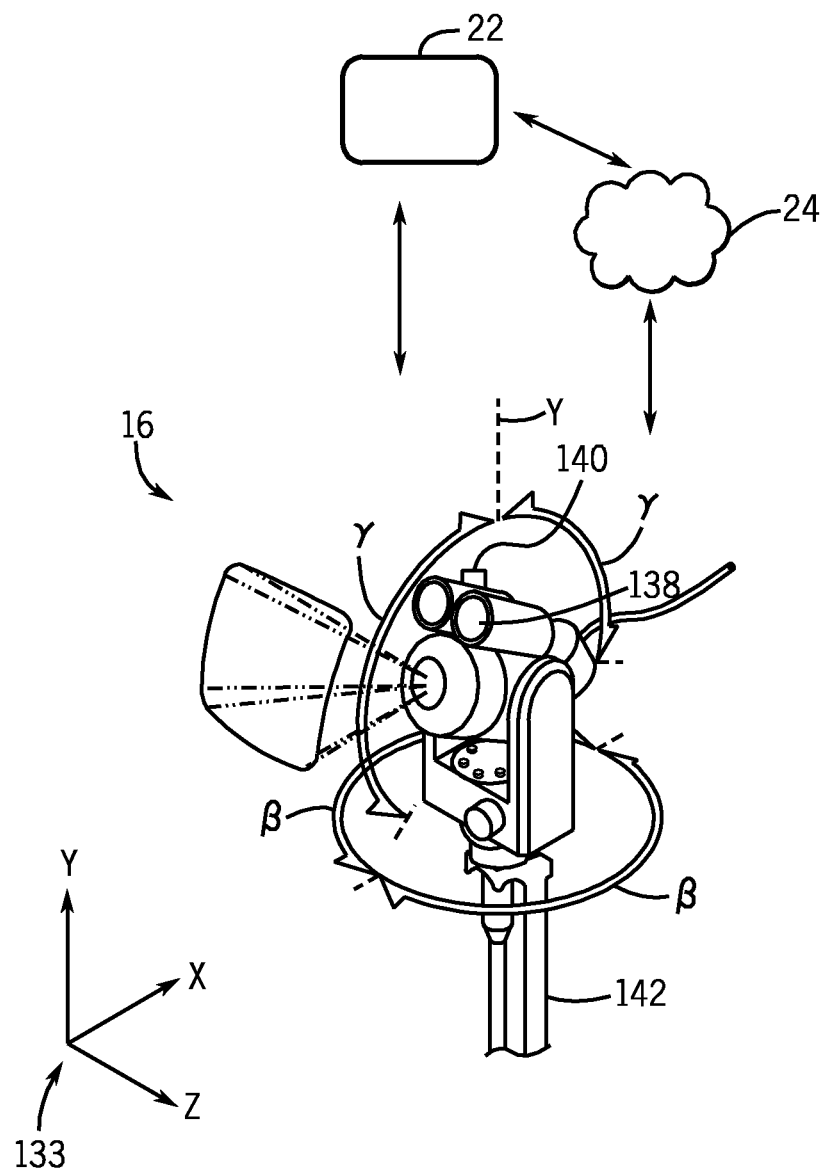
FIG. 4 is an illustration of an embodiment of a pan-tilt-zoom (PTZ) camera system communicatively coupled to the mobile device of FIG. 1.

FIG. 4 is a perspective view of an embodiment of the transportable PTZ camera 16 communicatively coupled to the mobile device 22 and to the cloud 24. As mentioned above, the mobile device 22 and/or the cloud 24 may remotely manipulate the PTZ camera 16 to position the PTZ camera 16 to view desired equipment and locations. In the depicted example, the PTZ camera 16 may be tilted and rotated about the Y-axis. For example, the PTZ camera 16 may be rotated at an angle β between approximately 0° to 180°, 0° to 270°, 0° to 360°, or more about the Y-axis. Likewise, the PTZ camera 16 may be tilted, for example, about the Y-X plane at an angle γ of approximately 0° to 100°, 0° to 120°, 0° to 150°, or more with respect to the Y-Axis. Lights 138 may be similarly controlled, for example, to active or deactivate, and to increase or decrease a level of illumination (e.g., lux) to a desired value. Sensors 140, such as a laser rangefinder, may also be mounted onto the PTZ camera 16, suitable for measuring distance to certain objects. Other sensors 140 may be used, including long-range temperature sensors (e.g., infrared temperature sensors), pressure sensors, flow sensors, clearance sensors, and so on.

The PTZ camera 16 may be transported to a desired location, for example, by using a shaft 142. The shaft 142 enables the camera operator 30 to move the camera and to position the camera, for example, inside of locations 86, 108, underwater 88, into hazardous (e.g., hazmat) locations, and so on. Additionally, the shaft 142 may be used to more permanently secure the PTZ camera 16 by mounting the shaft 142 onto a permanent or semi-permanent mount. In this manner, the PTZ camera 16 may be transported and/or secured at a desired location. The PTZ camera 16 may then transmit, for example by using wireless techniques, image data, video data, sensor 140 data, and the like, to the mobile device 22 and/or cloud 24. Accordingly, data received from the PTZ camera 16 may be remotely analyzed and used to determine the condition and suitability of operations for desired equipment and facilities. Indeed, the techniques described herein may provide for a comprehensive inspection and maintenance process suitable for planning, inspecting, analyzing, and/or sharing a variety of data by using the aforementioned devices 12, 14, 16, 22, 92, 94, 96, and the cloud 24, as described in more detail below with respect to FIG. 5.

Figure 5:
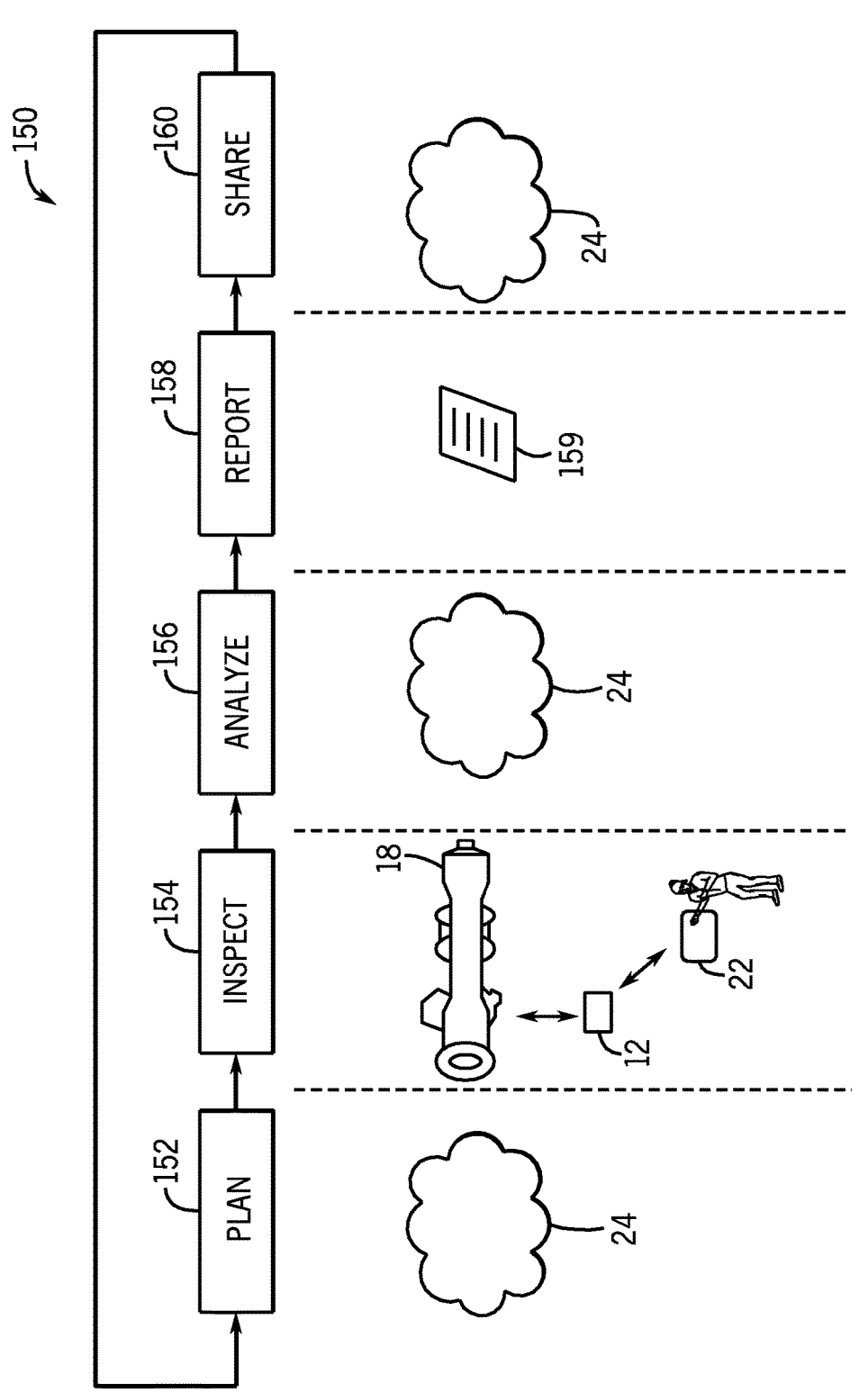
FIG. 5 is a flowchart illustrating an embodiment of a process useful in using the distributed NDT system for planning, inspecting, analyzing, reporting, and sharing of data, such as inspection data.

FIG. 5 is a flowchart of an embodiment of a process 150 suitable for planning, inspecting, analyzing, and/or sharing a variety of data by using the aforementioned devices 12, 14, 16, 22, 92, 94, 96, and the cloud 24. Indeed, the techniques described herein may use the devices 12, 14, 16, 22, 92, 94, 96 to enable processes, such as the depicted process 150, to more efficiently support and maintain a variety of equipment. In certain embodiments, the process 150 or portions of the process 150 may be included in non-transitory computer-readable media stored in memory, such as the memory 15, 19, 23, 93, 97, 101 and executable by one or more processors, such as the processors 17, 21, 25, 95, 99, 103.

In one example, the process 150 may plan (block 152) for inspection and maintenance activities. Data acquired by using the devices 12, 14, 16, 22, 42, 44, 46, an others, such as fleet data acquired from a fleet of turbomachinery 18, from equipment users (e.g., aircraft 104 service companies), and/or equipment manufacturers, may be used to plan (block 152) maintenance and inspection activities, more efficient inspection schedules for machinery, flag certain areas for a more detailed inspection, and so on. The process 150 may then enable the use of a single mode or a multi-modal inspection (block 154) of desired facilities and equipment (e.g., turbomachinery 18). As mentioned above, the inspection (block 154) may use any one or more of the NDT inspection devices 12 (e.g., borescope 14, PTZ camera 16, eddy current inspection device 92, ultrasonic flaw detector 94, digital radiography device 96), thus providing with one or more modes of inspection (e.g., visual, ultrasonic, eddy current, x-ray). In the depicted embodiment, the mobile device 22 may be used to remote control the NDT inspection devices 12, to analyze data communicated by the NDT inspection devices 12, to provide for additional functionality not included in the NDT inspection devices 12 as described in more detail herein, to record data from the NDT inspection devices 12, and to guide the inspection (block 154), for example, by using menu-driven inspection (MDI) techniques, among others.

Results of the inspection (block 154), may then be analyzed (block 156), for example, by using the NDT device 12, by transmitting inspection data to the cloud 24, by using the mobile device 22, or a combination thereof. The analysis may include engineering analysis useful in determining remaining life for the facilities and/or equipment, wear and tear, corrosion, erosion, and so forth. The analysis may additionally include operations research (OR) analysis used to provide for more efficient parts replacement schedules, maintenance schedules, equipment utilization schedules, personnel usage schedules, new inspection schedules, and so on. The analysis (block 156) may then be reported (block 158), resulting in one or more reports 159, including reports created in or by using the cloud 24, detailing the inspection and analysis performed and results obtained. The reports 159 may then be shared (block 160), for example, by using the cloud 24, the mobile device 22, and other techniques, such as workflow sharing techniques. In one embodiment, the process 150 may be iterative, thus, the process 150 may iterate back to planning (block 152) after the sharing (block 160) of the reports 159. By providing for embodiments useful in using the devices (e.g., 12, 14, 16, 22, 92, 94, 96) described herein to plan, inspect, analyze, report, and share data, the techniques described herein may enable a more efficient inspection and maintenance of the facilities 20, 106 and the equipment 18, 104. Indeed, the transfer of multiple categories of data may be provided, as described in more detail below with respect to FIG. 6.

Figure 6:
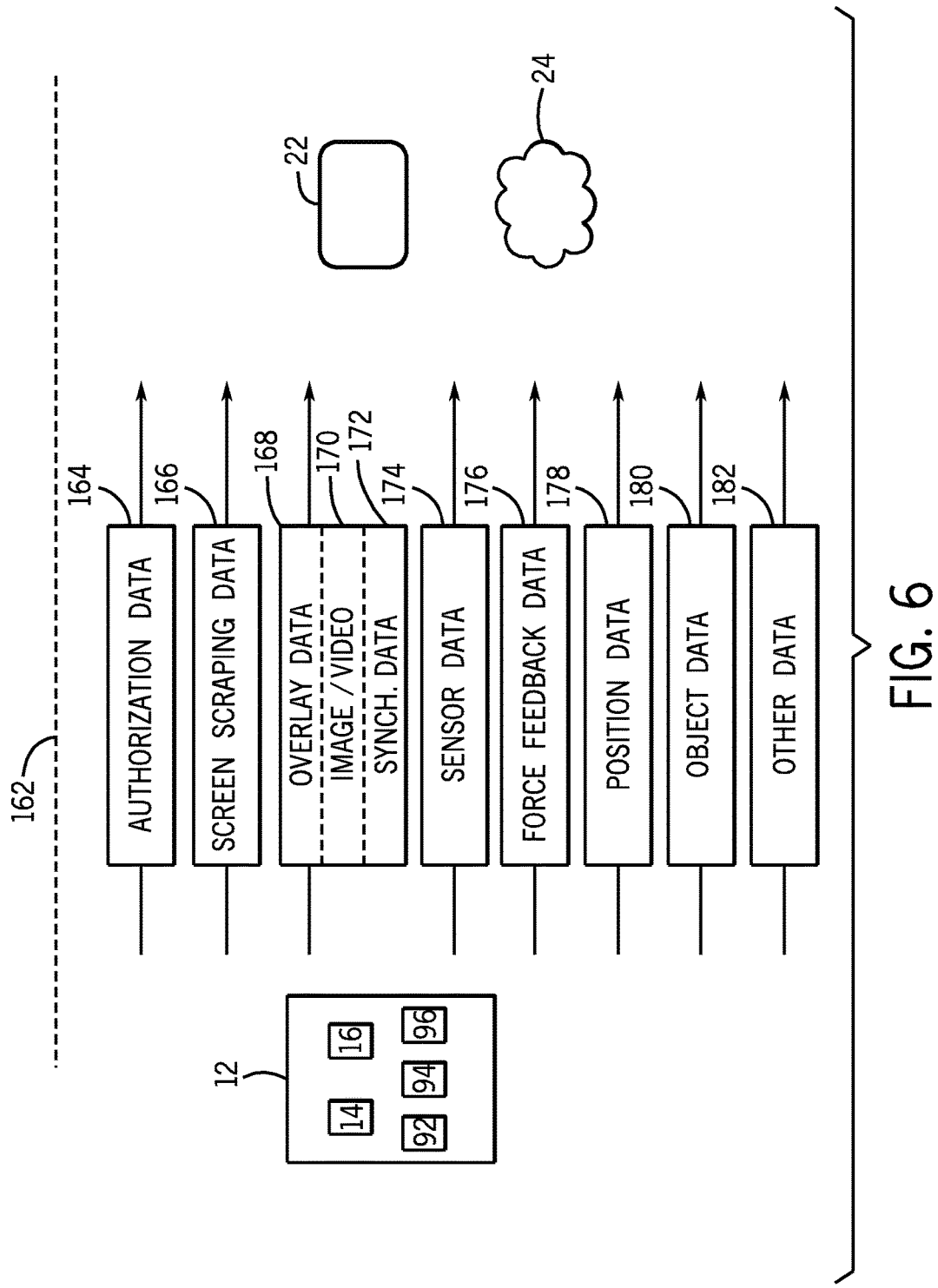
FIG. 6 is a block diagram of an embodiment of information flow through a wireless conduit.

FIG. 6 is a data flow diagram depicting an embodiment of the flow of various data categories originating from the NDT inspection devices 12 (e.g., devices 14, 16, 92, 94, 96) and transmitted to the mobile device 22 and/or the cloud 24. As mentioned above, the NDT inspection devices 12 may use a wireless conduit 162 to transmit the data. In one embodiment, the wireless conduit 112 may include WiFi (e.g., 802.11X), cellular conduits (e.g., HSPA, HSPA+, LTE, WiMax), NFC, Bluetooth, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. Accordingly, an authorization data 164 may be used to provide any number of authorization or login information suitable to pair or otherwise authenticate the NDT inspection device 12 to the mobile device 22 and/or the cloud 24. Additionally, the wireless conduit 162 may dynamically compress data, depending on, for example, currently available bandwidth and latency. The mobile device 22 may then uncompress and display the data. Compression/decompression techniques may include H.261, H.263, H.264, moving picture experts group (MPEG), MPEG-1, MPEG-2, MPEG-3, MPEG-4, DivX, and so on.

In certain modalities (e.g., visual modalities), images and video may be communicated by using certain of the NDT inspection devices 12. Other modalities may also send video, sensor data, and so on, related to or included in their respective screens. The NDT inspection device 12 may, in addition to capturing images, overlay certain data onto the image, resulting in a more informative view. For example, a borescope tip map may be overlaid on the video, showing an approximation of the disposition of a borescope tip during insertion so as to guide the operator 26 to more accurately position the borescope camera 126. The overlay tip map may include a grid having four quadrants, and the tip 136 disposition may be displayed as dot in any portion or position inside of the four quadrants. A variety of overlays may be provided, as described in more detail below, including measurement overlays, menu overlays, annotation overlays, and object identification overlays. The image and video data, such as the video 84, may then be displayed, with the overlays generally displayed on top of the image and video data.

In one embodiment, the overlays, image, and video data may be "screen scraped" from the screen 135 and communicated as screen scrapping data 166. The screen scrapping data 166 may then be displayed on the mobile device 22 and other display devices communicatively coupled to the cloud 24. Advantageously, the screen scrapping data 166 may be more easily displayed. Indeed, because pixels may include both the image or video and overlays in the same frame, the mobile device 22 may simply display the aforementioned pixels. However, providing the screen scraping data may merge both the images with the overlays, and it may be beneficial to separate the two (or more) data streams. For example, the separate data streams (e.g., image or video stream, overlay stream) may be transmitted approximately simultaneously, thus providing for faster data communications. Additionally, the data streams may be analyzed separately, thus improving data inspection and analysis.

Accordingly, in one embodiment, the image data and overlays may be separated into two or more data streams 168 and 170. The data stream 168 may include only overlays, while the data stream 170 may include images or video. In one embodiment, the images or video 170 may be synchronized with the overlays 168 by using a synchronization signal 172. For example, the synchronization signal may include timing data suitable to match a frame of the data stream 170 with one or more data items included in the overlay stream 168. In yet another embodiment, no synchronization data 172 data may be used. Instead, each frame or image 170 may include a unique ID, and this unique ID may be matched to one or more of the overlay data 168 and used to display the overlay data 168 and the image data 170 together.

The overlay data 168 may include a tip map overlay. For example, a grid having four squares (e.g., quadrant grid) may be displayed, along with a dot or circle representing a tip 136 position. This tip map may thus represent how the tip 136 is being inserted inside of an object. A first quadrant (top right) may represent the tip 136 being inserted into a top right corner looking down axially into the object, a second quadrant (top left) may represent the tip 136 being inserted into a left right corner looking down axially, a third quadrant (bottom left) may represent the tip 136 being inserted into a bottom left corner, and a fourth quadrant (bottom right) may represent the tip 136 being inserted into a bottom right corner. Accordingly, the borescope operator 26 may more easily guide insertion of the tip 136.

The overlay data 168 may also include measurement overlays. For example, measurement such as length, point to line, depth, area, multi-segment line, distance, skew, and circle gauge may be provided by enabling the user to overlay one or more cursor crosses (e.g., "+") on top of an image. In one embodiment a stereo probe measurement tip 136, or a shadow probe measurement tip 136 may be provided, suitable for measurements inside of objects, including stereoscopic measurements and/or by projecting a shadow onto an object. By placing a plurality of cursor icons (e.g., cursor crosses) over an image, the measurements may be derived using stereoscopic techniques. For example, placing two cursors icons may provide for a linear point-to-point measurement (e.g., length). Placing three cursor icons may provide for a perpendicular distance from a point to a line (e.g., point to line). Placing four cursor icons may provide for a perpendicular distance between a surface (derived by using three cursors) and a point (the fourth cursor) above or below the surface (e.g., depth). Placing three or more cursors around a feature or defect may then give an approximate area of the surface contained inside the cursors. Placing three or more cursors may also enable a length of a multi-segment line following each cursor.

Likewise, by projecting a shadow, the measurements may be derived based on illumination and resulting shadows. Accordingly, by positioning the shadow across the measurement area, then placing two cursors as close as possible to the shadow at furthermost points of a desired measurement may result in the derivation of the distance between the points. Placing the shadow across the measurement area, and then placing cursors at edges (e.g., illuminated edges) of the desired measurement area approximately to the center of a horizontal shadow may result in a skew measurement, otherwise defined as a linear (point-to-point) measurement on a surface that is not perpendicular to the probe 14 view. This may be useful when a vertical shadow is not obtainable.

Similarly, positioning a shadow across the measurement area, and then placing one cursor on a raised surface and a second cursor on a recessed surface may result in the derivation of depth, or a distance between a surface and a point above or below the surface. Positioning the shadow near the measurement area, and then placing a circle (e.g., circle cursor of user selectable diameter, also referred to as circle gauge) close to the shadow and over a defect may then derive the approximate diameter, circumference, and/or area of the defect.

Overlay data 168 may also include annotation data. For example, text and graphics (e.g. arrow pointers, crosses, geometric shapes) may be overlaid on top of an image to annotate certain features, such as "surface crack." Additionally, audio may be captured by the NDT inspection device 12, and provided as an audio overlay. For example, a voice annotation, sounds of the equipment undergoing inspection, and so on, may be overlaid on an image or video as audio. The overlay data 168 received by the mobile device 22 and/or cloud 24 may then be rendered by a variety of techniques. For example, HTML5 or other markup languages may be used to display the overlay data 168. In one embodiment, the mobile device 22 and/or cloud 24 may provide for a first user interface different from a second user interface provided by the NDT device 12. Accordingly, the overlay data 168 may be simplified and only send basic information. For example, in the case of the tip map, the overlay data 168 may simply include X and Y data correlative to the location of the tip, and the first user interface may then use the X and Y data to visually display the tip on a grid.

Additionally sensor data 174 may be communicated. For example, data from the sensors 126, 140, and x-ray sensor data, eddy current sensor data, and the like may be communicated. In certain embodiments, the sensor data 174 may be synchronized with the overlay data 168, for example, overlay tip maps may be displayed alongside with temperature information, pressure information, flow information, clearance, and so on. Likewise, the sensor data 174 may be displayed alongside the image or video data 170.

In certain embodiments, force feedback or haptic feedback data 176 may be communicated. The force feedback data 176 may include, for example, data related to the borescope 14 tip 136 abutting or contacting against a structure, vibrations felt by the tip 136 or vibration sensors 126, force related to flows, temperatures, clearances, pressures, and the like. The mobile device 22 may include, for example, a tactile layer having fluid-filled microchannels, which, based on the force feedback data 176, may alter fluid pressure and/or redirect fluid in response. Indeed, the techniques describe herein, may provide for responses actuated by the mobile device 22 suitable for representing sensor data 174 and other data in the conduit 162 as tactile forces.

The NDT devices 12 may additionally communicate position data 178. For example, the position data 178 may include locations of the NDT devices 12 in relation to equipment 18, 104, and/or facilities 20, 106. For example, techniques such as indoor GPS, RFID, triangulation (e.g., WiFi triangulation, radio triangulation) may be used to determine the position 178 of the devices 12. Object data 180 may include data related to the object under inspection. For example, the object data 180 may include identifying information (e.g., serial numbers), observations on equipment condition, annotations (textual annotations, voice annotations), and so on. Other types of data 182 may be used, including but not limited to menu-driven inspection data, which when used, provides a set of pre-defined "tags" that can be applied as text annotations and metadata. These tags may include location information (e.g., $1^{st}$ stage HP compressor) or indications (e.g., foreign object damage) related to the object undergoing inspection. Other data 182 may additionally include remote file system data, in which the mobile device 22 may view and manipulate files and file constructs (e.g., folders, subfolders) of data located in the memory 25 of the NDT inspection device 12. Accordingly, files may be transferred to the mobile device 22 and cloud 24, edited and transferred back into the memory 25. By communicating the data 164-182 to the mobile device 22 and the cloud 24, the techniques described herein may enable a faster and more efficient process 150.

Auto-Configuration Based on Voice Inspection Data

As previously discussed, it may be beneficial to plan, execute, and/or report on an inspection instrument based upon voice tags obtained via voice recordings of an inspection. This may, for example, increase inspection efficiency by reducing the workload of an inspector or increasing an amount of useful data presented to the inspector. For example, in some embodiments, voice tags may be used to increase the dexterity of an inspector by removing once physically demanding tasks. For example, an inspector may be able to provide voice commands to complete tasks that have traditionally required manual user intervention, such as navigating steps of an inspection plan via an onboard application. While inspectors of traditional systems may need to manually select inspection steps, inspectors using the current technique may "talk" their way through the inspection, either by explicitly stating a particular step selection or by step detection of the instrument based upon the keywords provided by the inspector. Further, the voice tags may be useful for creating audible filters for inspection data. The audible filters may be searchable keywords and/or phrases that are assigned based upon keywords and/or phrases detected in the voice recordings. These audible filters may provide more efficient access to inspection data.

Figure 7:
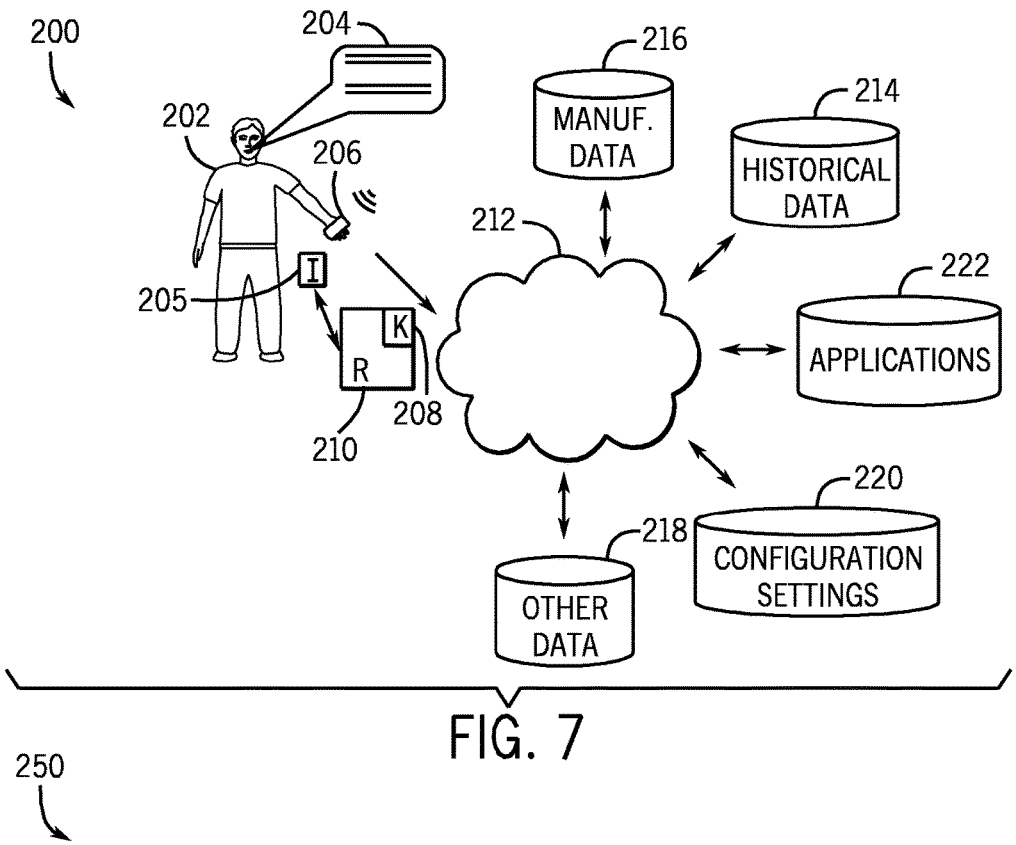
FIG. 7 is a schematic diagram of an inspection system using voice guided inspection planning, execution, and recording, in accordance with an embodiment.

FIG. 7 is a schematic diagram of an inspection system 200 using voice guided inspection planning, execution, and recording, in accordance with an embodiment. As illustrated, inspectors 202 oftentimes provide audible annotations or findings 204 during an inspection. For example, inspectors 202 may verbally record words and phrases associated with an inspection, such as the date and/or time of the inspection, as well as particular observations made during an inspection, such as "observed minor cracking on the left wing of the aircraft." These recordings have traditionally been obtained using, for example, standalone analog tape recorders, digital audio recorders, or digital video recorders. In some instances, recordings have been captured and associated with inspection data, but there has traditionally not been efficient ways to search based upon these recordings. However, in the current embodiment, an inspection instrument 206 such as the mobile device 22 and/or an inspection tool (e.g., a borescope 14, ultrasound device 94, or radiography equipment 96) may include a digital audio and/or digital video recorder that is configured to capture the audible findings 204 of an inspector 202 during an inspection and data mine the recordings, to enable searching based upon data captured in the recordings. As inspection data 205 is accumulated by the inspection instrument 206, keywords 208 and other phrases of the recording 210 may be interpreted and attributed to the current inspection data 205 that is being obtained during the same inspection. For example, the keywords 208 and other phrases may be stored as metadata (data describing the inspection data 205). Accordingly, as this inspection data 205 is provided to a data source for storing and subsequent retrieval, the keywords 208 and other phrases of the recording 210 may be used to filter the data.

Additionally, the keywords 208 and other phrases of the recording 210 may be provided to a cloud service 212 (e.g., included in the cloud 24) that provides additional information to the inspector 202 via the inspection instrument 206. For example, upon the derivation of a keyword 208 such as "crack" and a phrase such as "left wing," the cloud services 212 may query a historical data repository 214 or other data repository for previously captured inspection data relating to the detected crack in the left wing of the particular aircraft that is currently under inspection. Further, the cloud services 212 may poll manufacturer data repositories 216 or other external data repositories 218 for information regarding cracks in the left wing of the particular aircraft model. Additionally or alternatively, the cloud services may also attempt to search for particular configuration settings (e.g., fine tuning) of the inspection instrument that may be useful, as dictated by a configuration settings data repository 220 and/or may attempt to find digital applications and/or references (e.g., download links) to such digital applications, which may aid in further inspection of the left wing crack, as dictated by an application data repository 222.

As may be appreciated, by automatically interpreting and/or attributing keywords 208 and other phrases of a recording 210 to a set of inspection data, the data may be more readily available by creating a new type of audible filter for the inspection data. Further, interpreting these keywords 208 and other phrases of the recording 210 creates a powerful mechanism for searching for supplemental information for an inspection that may be useful to the inspector 202. Accordingly, the inspector 202 may be provided supplemental information or data that aids the inspection, such that the inspector can capture more useful inspection data based upon the aid of the supplemental information.

Figure 8:
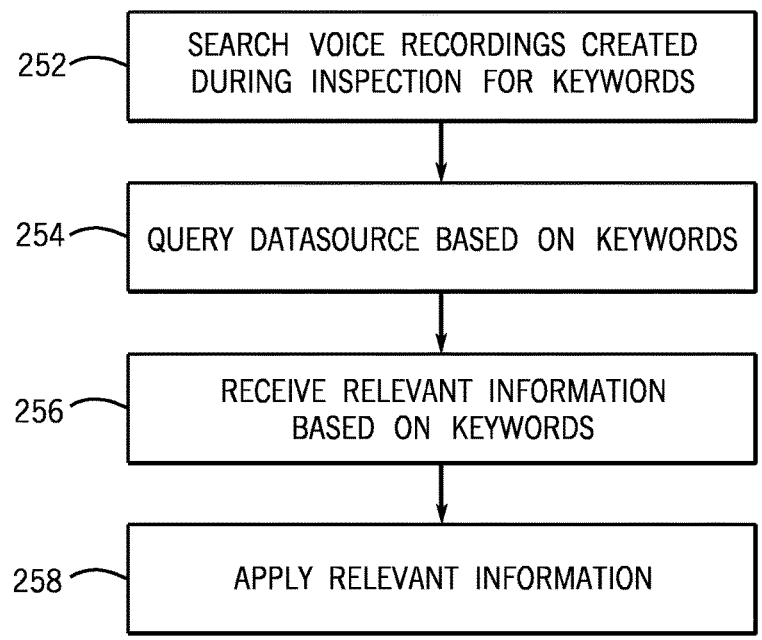
FIG. 8 is a flowchart illustrating a process for obtaining data based upon voice recordings recorded during an inspection process, in accordance with an embodiment.

FIG. 8 is a flowchart illustrating a process 250 for obtaining data based upon voice recordings recorded during an inspection process, in accordance with an embodiment. The process 250 may be implemented as executable non-transitory computer instructions stored in a computer readable medium, such as the memories 17, 21, 25, 95, 103 and/or the cloud 24. The process 250 begins by analyzing voice recordings, created during an inspection, for specific keywords and other phrases in the voice recordings (block 252). For example, analysis of the voice recordings may make use of one or more "voice dictionaries" that identify verbal forms of words and/or phrases, such that the words may be interpreted in an overall voice recording. Inspectors may use a highly specialized jargon when providing inspection findings. Accordingly, specialized jargon dictionaries may be utilized in the voice recording analysis. For example, voice dictionaries might include a manufacturer specific dictionary defining words and/or phrases that are part of the manufacturer's lexicography and/or other words and phrases that may be specific to a particular manufacturer's products. For example, aircraft made by the Pratt & Whitney Company may include vastly different parts than an aircraft made by Boeing. Accordingly, manufacturer specific dictionaries may define the words and/or phrases associated with the different manufacturers. The inspection instrument and/or cloud based services may select dictionaries based on the current object that is being inspected along with many other factors. For example, there may be different translations for a dictionary based upon the language of the inspector. Virtually any factors that may produce different vocabularies may be used in the creation, selection, and usage of different voice dictionaries.

It may be useful to note that the current word and/or phrases used as references are not limited to words found in a dictionary. For example, a learning dictionary may be provided such that the inspector can be his own lexicographer. When a word is not detectable using the current voice databases, it may be placed into the learning dictionary, which, over time, may determine a pattern in the inspector's usage of a particular word, thus, obtaining a new understanding of the word.

Once the keywords and phrases are obtained, data sources may be queried for relevant information based upon the keywords and phrases (block 254). Based upon the queries, relevant information is received (block 256). For example, as discussed above, there are numerous sources that may be queried. For example, a historical data repository may provide historical inspection data based upon the current keywords and/or phrases. Further, manufacturer data repositories may provide product-specific information from a manufacturer, such as service advisories, product recalls, manufacturer specific notices, etc. Similarly, maintenance shop repositories may be used, specific to lexicon associated with the maintenance shop. Additionally, other data repositories may also provide supplemental information. For example, the keywords and/or phrases may be provided to an Internet search engine that produces relevant information and/or Internet URLs relating to information about the keywords and/or phrases. Further, a configuration settings data repository may include suggestions for configuration tweaks based upon keywords and/or phrases and an applications data repository may provide suggestions for digital application downloads based upon keywords and/or phrases.

Once the relevant data (e.g., the historical data, the manufacturer and/or other data, the configuration settings, and/or the application recommendations) are received, this relevant data may be applied to the inspection instrument (block 258). For example, relevant historical data, manufacturer data, and/or other data may be presented to the inspector via a display of the inspection instrument. Further, the suggested configuration settings may be provided to the inspection instrument, either by automatically applying the configuration settings or prompting the inspector to approve the suggested configuration settings. Further, the suggested applications may be automatically downloaded to the inspection instrument, a prompt may solicit approval from the inspector to download the applications, or a notice that suggested applications are available for download may be provided via the display of the inspection instrument.

Figure 9:
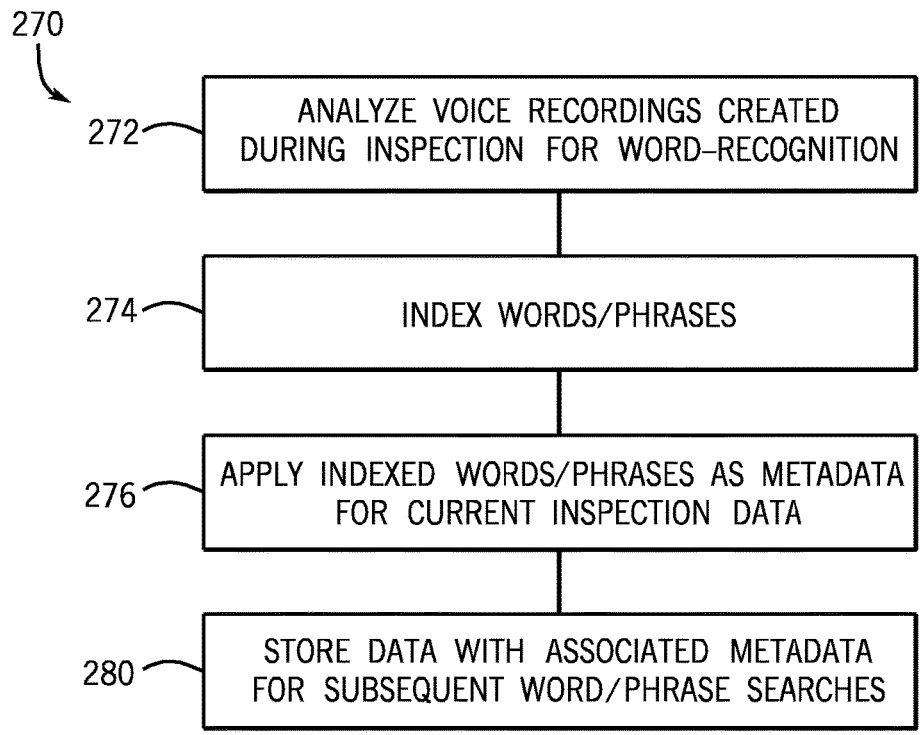
FIG. 9 is a flowchart illustrating a process for adding keywords to data based upon voice recordings associated with the data, in accordance with an embodiment.

FIG. 9 is a flowchart illustrating a process 270 for adding keywords (e.g., as metadata) to data based upon voice recordings associated with the data, in accordance with an embodiment. The process 270 may be implemented as executable non-transitory computer instructions stored in a computer readable medium, such as the memories 17, 21, 25, 95, 103 and/or the cloud 24. In some embodiments, the process 270 may occur in near-real-time, as the voice recordings are being generated. However, in some embodiments, the process 270 may occur as a batch process, after the voice recordings have already been created. This may enable previously obtained inspection data with associated recordings to be data mined and retro-fitted with one or more audible filters. The process 270 begins by analyzing the voice recordings created during the inspection for word and/or phrase recognition (block 272). For example, as discussed above, voice dictionaries may provide inspection-specific jargon for particular products being inspected, particular manufacturers, particular job-sites, particular business organizations, etc. The dictionaries may be selected by the inspection instrument based upon characteristics of the current inspection, characteristics of the current inspector, or any other characteristics that may affect the vocabulary usage. Further, the learning dictionaries described above may also be useful during the analysis of the voice recordings. Additionally, in some embodiments, it may be beneficial to enable inspection instruments and/or inspection sites to learn jargon from one another. For example, an instrument that has inspected aircraft engines in the past may be likely to inspect aircraft engines in the future. Thus, this instrument may encounter aviation jargon. Upon replacing the inspection device with a new inspection device, there may be value in the new inspection device learning the aviation jargon from the old inspection device. This exchange of information may occur, for example, in an instrument-to-instrument transfer, an instrument-to-cloud services transaction, and/or an instrument-to-media transaction.

Upon recognition of words and/or phrases, the words and/or phrases may be indexed (block 274) and used and applied as a reference for the current inspection data (block 276). For instance, if the inspector collects image data using a borescope and provides a voice inspection finding stating "cracking observed in the A1 port," the interpreted words and/or phrases may index the image data. Further, in some embodiments, near-real-time feedback may be provided, notifying the inspector whether or not particular words and/or phrases were discerned from the data. This may, for example, help the inspector to understand whether voice correction may be necessary and/or, in embodiments where the discerned phrases and/or keywords are provided in the notification, what future audible filters may provide access to the data.

As may be appreciated, this may create an audible filter to access the data in the future. Once the reference is applied, the data is stored with the associated reference for subsequent word and/or phrase searches (block 280). Accordingly, subsequent access to the inspection data may be facilitated through the keywords and/or phrases associated by the process 270. For example, future textual, graphical, and/or audible queries that relate to the associated words and/or phrases may result in returning the inspection data with the associated reference.

Figure 10:
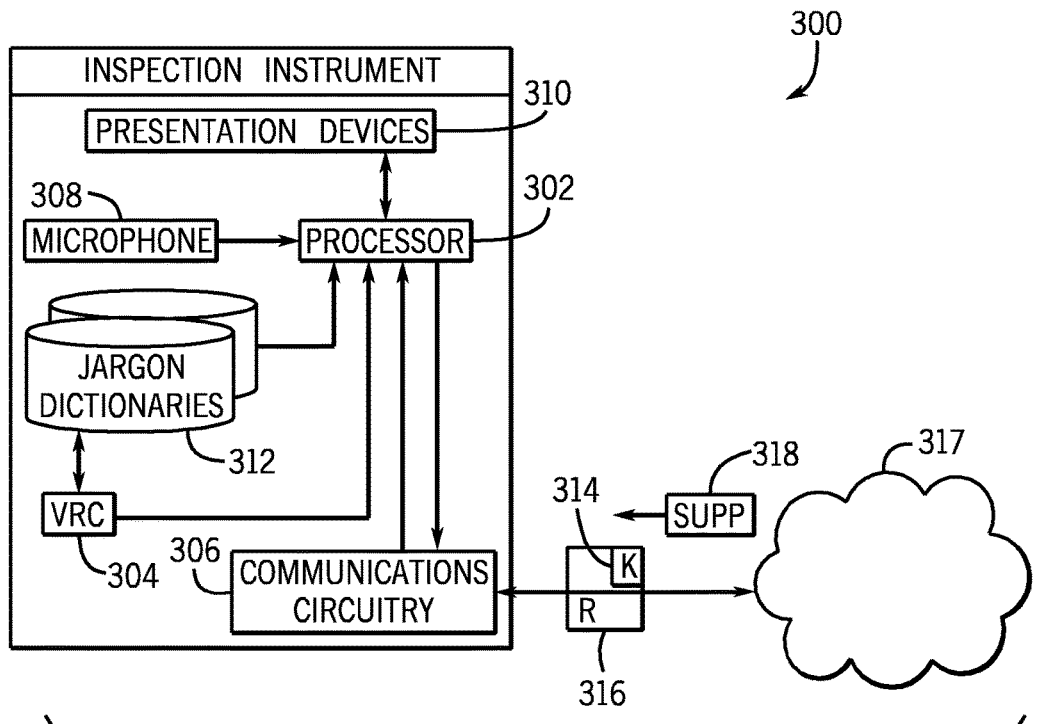
FIG. 10 is a schematic view of an inspection instrument enabled to execute at least one of the processes of FIG. 8 or FIG. 9, in accordance with an embodiment.

FIG. 10 is a schematic view of an inspection instrument 300 enabled to execute at least one of the processes 250 of FIG. 8 270 or FIG. 9, in accordance with an embodiment. As illustrated, the inspection instrument 300 (e.g., NDT device 12, mobile device 22) may include a processor 302, voice recognition circuitry 304, communications circuitry 306, a microphone 308, and one or more presentation devices 310. In addition, in some embodiments, the voice dictionaries 312 may reside on the inspection instrument 300. The processor 302 may coordinate computations of the inspection instrument 302. For example, the processor may drive computations of the voice recognition circuitry 304, which may recognize words and phrases obtained via voice recordings from the microphone 308. As discussed above, the voice dictionaries 312 may be useful in obtaining accurate voice recognition from the voice recognition circuitry 304. The communications circuitry 306 may provide the recognized keywords 314 and/or the entire recording 316 to the cloud based services 317, where they may be stored and/or used to query for supplemental information 318. For example, the supplemental information 318 may include historical data, communication settings, application suggestions, manufacturer information, etc., provided based upon the keywords 314. The communications circuitry 306 may receive the supplemental information 318 and the processor 302 may coordinate applying the supplemental information 318. For example, the processor 302 may coordinate presentation of historical data, manufacturer provided data, or other data via the presentation devices 310, such as a display or audible speaker of the inspection instrument 300. Further, the processor 302 may coordinate the download and installation of applications and/or configuration setting changes.

Figure 11:
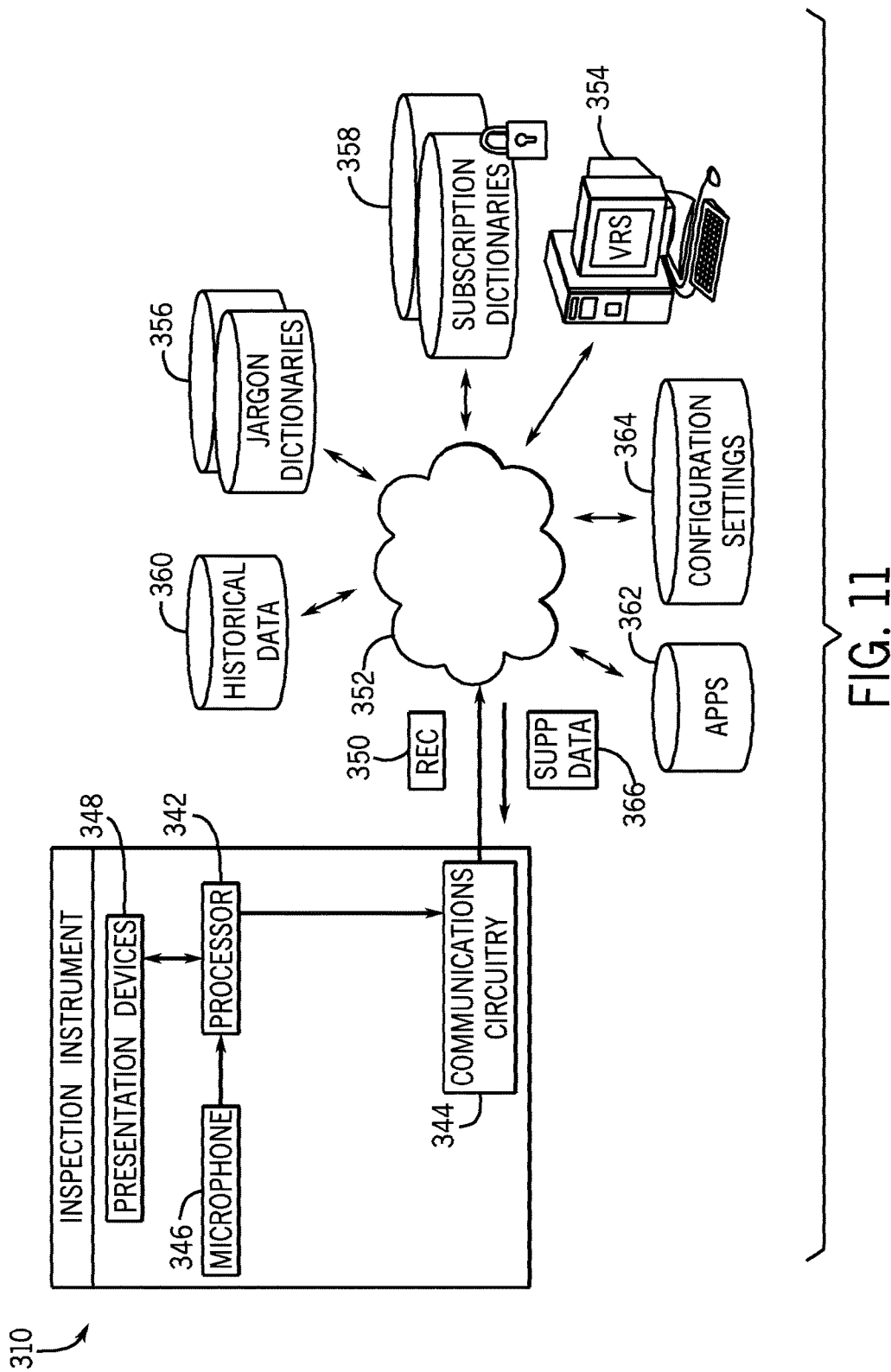
FIG. 11 is a schematic view of an inspection system that is enabled to plan, execute, and report on inspections, using a variety of data sources, in accordance with an embodiment.

FIG. 11 is a schematic view of an inspection instrument 340 that is enabled to plan, execute, and report on inspections, using a variety of data sources external to the inspection instrument 340, in accordance with an embodiment. Similar to the inspection instrument 300 of FIG. 10, the inspection instrument 340 (e.g., NDT device 12, mobile device 22) includes a process 342, communications circuitry 344, a microphone 346, and presentation devices 348. However, in contrast to the inspection instrument 300 of FIG. 10, the inspection instrument 340 relies on external services to provide the voice recognition services, keyword and/or phrase referencing, and data querying. The communications circuitry 344 may provide the recording 350 to the cloud-computing services 352. A voice recognition service 354 associated with the cloud-computing service 352 (e.g., included in the cloud 24) may analyze the recording 350 and determine keywords and/or phrases that may be used as a reference for the recording 350 and the inspection data associated with the recording 350. In some embodiments, additional information may be discerned from the recording 350. For example, the voice recognition service 354 may detect subjective factors like inspector surprise or other emotions. Further the service 354 may detect whether a statement contained in the recording 350 is a question or a statement, which may impact whether the statement is used as part of an audible filter. The voice recognition service 354 may use jargon dictionaries 356, subscription dictionaries 358 (e.g., dictionaries that require a fee from the dictionary provider), or other dictionaries. Based upon the keywords and/or phrases provided by the voice recognition services 354, the cloud-computing services may provide supplemental data 366, such as historical data from a historical data repository 360, applications from an application data repository 362, and/or configuration settings from a configuration settings data repository 364. It will be appreciated by those of skill in the art that further variation of the locations of the functions and features described with reference to FIGS. 10 and 11 are equally contemplated.

As may be appreciated, by using the voice inspection report to apply additional information to the inspection instrument, the inspection process may be more efficient. For one, the inspector may receive supplemental information that may prompt the inspector to capture additional data, whereas previously the inspector might only have such information available upon doing a manual search off-site, needlessly necessitating a separate trip to capture the additional data prompted by the supplemental data. Further, the inspector may not have to complete any additional steps to receive this supplemental data. By harnessing data already created by the inspector and using it in a new way, the inspector is provided an enhanced inspection experience, without enforcing new inspection steps or activities.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    analyzing, using a computer processor, an inspection audio recording for keywords associated with an inspection, by:
    recording, during the inspection, using at least one of an inspection tool and an inspection instrument communicatively coupled to the inspection tool, the inspection audio recording, wherein the inspection audio recording comprises audible annotations comprising comments of the inspection from an inspector performing the inspection, the comments comprising data minable keywords related to the inspection;
    sending, using the at least one of the inspection tool and the inspection instrument, the inspection audio recording to a cloud-based voice recognition service to data mine the inspection audio recording for the keywords; and
    obtaining, using the at least one of the inspection tool and the inspection instrument, the keywords from the voice recognition service;
    querying, using the at least one of the inspection tool and the inspection instrument, a data source for relevant inspection information relating to the;
    receiving, as a result of the querying, using the at least one of the inspection tool and the inspection instrument, relevant inspection information from the data source, the relevant inspection information comprising one or more configuration settings of the at least one of the inspection tool and the inspection instrument; and
    applying, using the at least one of the inspection tool and the inspection instrument, the one or more configuration settings of the at least one of the inspection tool and the inspection instrument;
    wherein the inspection tool comprises at least one of: a borescope, an ultrasound device, radiography equipment, a camera, an x-ray inspection device, and an eddy current device; and wherein the inspection instrument comprises: a computing device communicatively coupled to the inspection tool.

2. The method of claim 1, wherein analyzing the inspection audio recordings comprises using voice recognition logic to interpret the keywords from the inspection audio recording.

3. The method of claim 1, comprising using a jargon dictionary to analyze the inspection audio recording.

4. The method of claim 1, wherein applying the relevant inspection information comprises automatically installing one or more applications on the at least one of the inspection tool and the inspection instrument using a reference to the one or more applications.

5. The method of claim 1, wherein analyzing the inspection audio recording comprises:
    interpreting the inspection audio recording using voice recognition logic of an inspection instrument; and
    obtaining the keywords from the interpreted inspection audio recording.

6. The method of claim 1, comprising using a dictionary specific to an object or a manufacturer or the object that is being inspected, to analyze the inspection audio recording.

7. A method, comprising:
    analyzing, using a computer processor, an inspection audio recording for keywords associated with an inspection, by:
    recording, during the inspection, using the at least one of an inspection tool and an inspection instrument communicatively coupled to the inspection tool, the inspection audio recording, wherein the inspection audio recording comprises audible annotations comprising comments of the inspection from an inspector performing the inspection, the comments comprising data minable keywords related to the inspection;
    sending, using the at least one of the inspection tool and the inspection instrument, the inspection audio recording to a cloud-based voice recognition service to data mine the inspection audio recording for the keywords; and
    obtaining, using the at least one of the inspection tool and the inspection instrument, the keywords from the voice recognition service;
    associating, using the at least one of the inspection tool and the inspection instrument, the keywords as metadata for inspection data acquired in time proximity to the audio recording, by the inspection tool; and
    storing the inspection data with the associated keywords such that subsequent queries on the keywords may retrieve the inspection data;
    wherein the inspection tool comprises: a borescope, ultrasound device, radiography equipment, camera, x-ray inspection device, eddy current device, or any combination thereof; and wherein the inspection instrument comprises: a computing device communicatively coupled to the inspection tool.

8. The method of claim 7, comprising:
    indexing the keywords; and
    associating the indexed keywords as metadata for the inspection data.

9. The method of claim 7, wherein the inspection audio recording is analyzed using a jargon dictionary specific to a manufacturer, an object being inspected, an inspection type, a maintenance facility, or any combination thereof.

10. The method of claim 7, comprising using a subscription dictionary to analyze the inspection audio recording, the subscription dictionary comprising a dictionary that bought with a fee.

11. A system, comprising:
    an inspection instrument, communicatively coupled to the inspection tool, comprising:
        communications circuitry, configured to communicatively couple the inspection instrument with information services;
        an audio input device, configured to record, during an inspection, an inspection audio recording comprising audible annotations comprising comments of the inspection from an inspector performing the inspection, the comments comprising data minable keywords related to the inspection;
        a processor, configured to query the information services by:
        requesting voice recognition service using a cloud-based service, by sending, using the at least one of the inspection tool and the inspection instrument, the inspection audio recording, wherein the voice recognition service comprises data mining the inspection audio recording for the keywords;
obtaining, using the at least one of the inspection tool and the inspection instrument, the keywords from the voice recognition service; and
sending a request to the information services based upon the received keywords interpreted from the inspection audio;
receiving, as a result of the request, using the at least one of the inspection tool and the inspection instrument, relevant inspection information from the information services, the relevant inspection information comprising configuration settings for the at least one of the inspection tool and the inspection instrument, or both; and
applying, using the at least one of the inspection tool and the inspection instrument, the one or more configuration settings of the at least one of the inspection tool and the inspection instrument;
wherein the inspection tool comprises: a borescope, ultrasound device, radiography equipment, camera, x-ray inspection device, eddy current device, or any combination thereof; and wherein the inspection instrument comprises: a computing device communicatively coupled to the inspection tool.

12. The system of claim 11, wherein the inspection instrument further comprises a voice recognition system configured to analyze the inspection audio for the keywords.

13. The system of claim 12, wherein the voice recognition system is configured to discern inspection-specific keywords using a special jargon dictionary.

14. The system of claim 13, wherein the special jargon dictionary comprises a dictionary related to a manufacturer of an object being inspected.

15. The system of claim 13, wherein the special jargon dictionary comprises a dictionary related to non-destructive testing keywords.

16. The system of claim 13, wherein the special jargon dictionary comprises a dictionary related to keywords that were used in previous inspections.

17. The system of claim 11, further comprising:
the information services, wherein the information services are configured to provide:
the configuration settings for the at least one of the inspection tool and the inspection instrument.

18. The system of claim 11, wherein the inspection instrument comprises a mobile device, configured to assist a non-destructive testing inspection, a computer, or a non-destructive testing tool.

* * * * *